United States Patent
Li et al.

(10) Patent No.: US 11,178,714 B2
(45) Date of Patent: Nov. 16, 2021

(54) PROXY CALL SESSION CONTROL FUNCTION FAILURE RECOVERING METHOD, APPARATUS AND SYSTEM

(71) Applicant: ZTE Corporation, Guangdong (CN)

(72) Inventors: Zhijun Li, Guangdong (CN); Yang Gao, Guangdong (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 16/780,824

(22) Filed: Feb. 3, 2020

(65) Prior Publication Data

US 2020/0178336 A1 Jun. 4, 2020

Related U.S. Application Data

(63) Continuation of application No. PCT/CN2018/098628, filed on Aug. 3, 2018.

(30) Foreign Application Priority Data

Aug. 3, 2017 (CN) .......................... 201710656469.4

(51) Int. Cl.
*H04W 4/00* (2018.01)
*H04W 76/18* (2018.01)
(Continued)

(52) U.S. Cl.
CPC ......... *H04W 76/18* (2018.02); *H04L 65/1016* (2013.01); *H04W 36/305* (2018.08); *H04W 60/00* (2013.01); *H04W 80/10* (2013.01)

(58) Field of Classification Search
None
See application file for complete search history.

(56) References Cited

U.S. PATENT DOCUMENTS

| 8,451,988 B2* | 5/2013 | Cai ..................... H04L 65/1096 379/88.11 |
| 2015/0195864 A1* | 7/2015 | Bartolome Rodrigo ..................... H04L 65/1073 370/221 |

(Continued)

FOREIGN PATENT DOCUMENTS

| CN | 101217407 A | 7/2008 |
| CN | 101577893 A | 11/2009 |

OTHER PUBLICATIONS

3GPP TS 23.380 V14.0.0, 3rd Generation Partnership Project; Technical Specification Group Core Network and Terminals; IMS Restoration Procedures (Release 14), Sep. 2016, 43 pages.

(Continued)

*Primary Examiner* — Gerald A Smarth
(74) *Attorney, Agent, or Firm* — Perkins Coie LLP

(57) ABSTRACT

Provided is a proxy call session control function (P-CSCF) failure recovery method. The method includes: sending, by a session management function (SMF), a SMF registration request to unified data management (UDM), where the SMF registration request carries Internet protocol multimedia core network subsystem (IMS) attribute information; receiving, by the SMF, a P-CSCF failure recovery indication sent by the UDM; registering, by the UDM, according to the IMS attribute information in the SMF registration request, the SMF; and initiating, by the SMF, according to the P-CSCF failure recovery indication, a P-CSCF failure recovery process. Further provided are a P-CSCF failure recovery method, a P-CSCF failure recovery apparatus, a P-CSCF failure recovery system, a storage medium and a processor.

12 Claims, 8 Drawing Sheets

(51) Int. Cl.
*H04W 36/30* (2009.01)
*H04L 29/06* (2006.01)
*H04W 60/00* (2009.01)
*H04W 80/10* (2009.01)

(56) References Cited

U.S. PATENT DOCUMENTS

| | | | |
|---|---|---|---|
| 2016/0380802 A1 | 12/2016 | Kunz et al. | |
| 2017/0134437 A1 | 5/2017 | Khalil et al. | |
| 2017/0238359 A1* | 8/2017 | Atarius | G01S 7/4817 370/259 |
| 2018/0375902 A1* | 12/2018 | Wong | H04W 52/0274 |
| 2019/0159071 A1* | 5/2019 | Yavuz | H04L 65/1006 |
| 2019/0253916 A1* | 8/2019 | Mathison | H04W 28/12 |
| 2019/0364541 A1* | 11/2019 | Ryu | H04W 76/25 |

OTHER PUBLICATIONS

International Search Report and Written Opinion dated Oct. 16, 2018 for International Application No. PCT/CN2018/098628, filed on Aug. 3, 2018 (8 pages).
3GPP TS 23.501, v1.0.0. Technical Specification, 3rd Generation Partnership Project; Technical Specification Group Services and System Aspects; System Architecture for the 5G System; Stage 2 (Release 15), pp. 1-155, Jun. 2017.
European Patent Office, Extended European Search Report dated Jun. 5, 2020 for EP Application No. 18840275.4, 7 pages.
3GPP TR 29.891 V0.3.0, Technical Report, 3rd Generation Partnership Project; Technical Specification Group Core Network and Terminals; 5G System—Phase 1; CT WG4 Aspects (Release 15), May 2017, 80 pages.
NTT DOCOMO, "Single registration with no Nx," SA WG2 Meeting #122, S2-174568, Jun. 2017, 15 pages.
ZTE, "Solution for P-CSCF Restoration," 3GPP TSG CT4 Meeting #79, C4-174152, Aug. 2017, 2 pages.

* cited by examiner

PROXY CALL SESSION CONTROL FUNCTION FAILURE RECOVERING METHOD, APPARATUS AND SYSTEM

CROSS REFERENCE TO RELATED APPLICATIONS

This patent document is a continuation of and claims the benefit of priority to International Patent Application No. PCT/CN2018/098628, filed on Aug. 3, 2018, which claims the benefit of priority of Chinese Patent Application No. 201710656469.4, filed on Aug. 3, 2017. The entire contents of the before-mentioned patent applications are incorporated by reference as part of the disclosure of this application.

TECHNICAL FIELD

The present disclosure relates to the field of communications, for example, to a proxy-call session control function (P-CSCF) failure recovery method, apparatus and system.

BACKGROUND

According to definition of the 3rd generation partnership project (3GPP) standard working group, the 4th generation mobile communication technology (4G) system has fully implemented the support for an Internet protocol multimedia core network subsystem (IMS). Multimedia sessions based on Internet Protocol (IP) can be realized through IMS. A 5th generation mobile network (5G) system is being developed by 3GPP. According to the definition of the 3GPP, the 5G system needs to support the IMS.

However, after the user equipment (UE) registers on the 5G network and establishes a packet data unit (PDU) session, the UE will register on unified data management (UDM). After the UE accesses to the 5G network, the UE obtains a proxy-call session control function (P-CSCF) address from the network, and initiates an IMS registration to the P-CSCF. After the registration succeeds, the UE is able to use the IMS service. Under this condition, when the P-CSCF serving the UE fails, the failure recovery method that UDM sends information to the session management function (SMF) via the access management function (AMF) to trigger the SMF re-sends a P-CSCF list to the UE, is not sufficient optimized.

SUMMARY

Embodiments of the present disclosure provide a P-CSCF failure recovery method, apparatus, and system for at least solving the problem of complexity in the process of triggering a P-CSCF failure recovery process through an AMF in the related art.

According to an embodiment of the present disclosure, a P-CSCF failure recovery method is provided. The method includes: sending, by a SMF, a SMF registration request to unified data management (UDM), where the SMF registration request carries Internet protocol multimedia core network subsystem (IMS) attribute information; after the SMF successfully registers on the UDM, receiving, by the SMF, a P-CSCF failure recovery indication sent by the UDM; and initiating, by the SMF, according to the P-CSCF failure recovery indication, a P-CSCF failure recovery process.

According to another embodiment of the present disclosure, another P-CSCF failure recovery method is provided. The method includes: receiving, by UDM, at least one SMF registration request from the SMF serving IMS, where one of the SMF registration requests carries IMS attribute information; selecting, by the UDM, a specified SMF according to the IMS attribute information in the SMF registration request; and sending, by the UDM, a P-CSCF failure recovery indication to the specified SMF, to enable the SMF to initiate a P-CSCF failure recovery process according to the P-CSCF failure recovery indication.

According to another embodiment of the present disclosure, a P-CSCF failure recovery apparatus, applied to a SMF, is provided. The apparatus includes: a request module, which is configured to send a SMF registration request to unified data management (UDM), where the SMF registration request carries Internet protocol multimedia core network subsystem (IMS) attribute information; a reception module, which is configured to receive, after the SMF successfully registers on the UDM, a P-CSCF failure recovery indication; and an initiation module, which is configured to initiate, according to the P-CSCF failure recovery indication, a P-CSCF failure recovery process.

According to another embodiment of the present disclosure, another P-CSCF failure recovery apparatus, applied to UDM, is provided. The apparatus includes: a reception module, which is configured to receive a SMF registration request from a SMF serving IMS, where the SMF registration carries IMS attribute information; a selection module, which is configured to select, according to the IMS attribute information in the SMF registration request, a specified SMF; a transmission module, which is configured to send a P-CSCF failure recovery indication to the specified SMF, to enable the SMF to initiate a P-CSCF failure recovery process according to the P-CSCF failure recovery indication.

According to another embodiment of the present disclosure, a P-CSCF failure recovery system including UDM and at least one SMF is provided. The SMF includes: a request module, which is configured to send a SMF registration request to UDM, where the SMF registration request carries Internet protocol multimedia core network subsystem (IMS) attribute information; a first reception module, which is configured to receive, after the SMF successfully registers on the UDM, a P-CSCF failure recovery indication; and an initiation module, which is configured to initiate, according to the P-CSCF failure recovery indication, a P-CSCF failure recovery process.

The UDM includes: a second reception module, which is configured to receive at least one SMF registration request from the SMF serving IMS, where one of the SMF registration requests carries IMS attribute information; a selection module, which is configured to select, according to the IMS attribute information in the SMF registration request, a specified SMF; a transmission module, which is configured to send a P-CSCF failure recovery indication to the specified SMF, to enable the SMF to initiate a P-CSCF failure recovery process according to the P-CSCF failure recovery indication.

According to another embodiment of the present disclosure, a computer-readable storage medium is further provided. The computer-readable storage medium is configured to store computer programs which, when executed by a professor, implement the above-mentioned method.

In one embodiment, the storage medium is further configured to store program codes for executing the following steps:

sending a SMF registration request to unified data management (UDM), where the SMF registration request carries Internet protocol multimedia core network subsystem (IMS) attribute information;

after the SMF successfully registers on the UDM, receiving, by the SMF, a P-CSCF failure recovery indication sent by the UDM; and initiating, according to the P-CSCF failure recovery indication, a P-CSCF failure recovery process.

In one embodiment, the storage medium is further configured to store program codes for executing the following steps:

receiving at least one SMF registration request from the SMF serving IMS, where one of the SMF registration requests carries IMS attribute information;

selecting, according to the IMS attribute information in the SMF registration request, a specified SMF; and sending a P-CSCF failure recovery indication to the specified SMF, to enable the SMF to initiate a P-CSCF failure recovery process according to the P-CSCF failure recovery indication.

In one embodiment, a process is further provided. The processor is configured to execute a program which, when executed, the program executes the above-mentioned method.

DETAILED DESCRIPTION

The present disclosure will be described hereinafter in detail with reference to the drawings and in conjunction with embodiments.

The terms "first", "second" and the like in the description, claims and above drawings of the present disclosure are used to distinguish between similar objects and are not necessarily used to describe a particular order or sequence.

Figure 1:
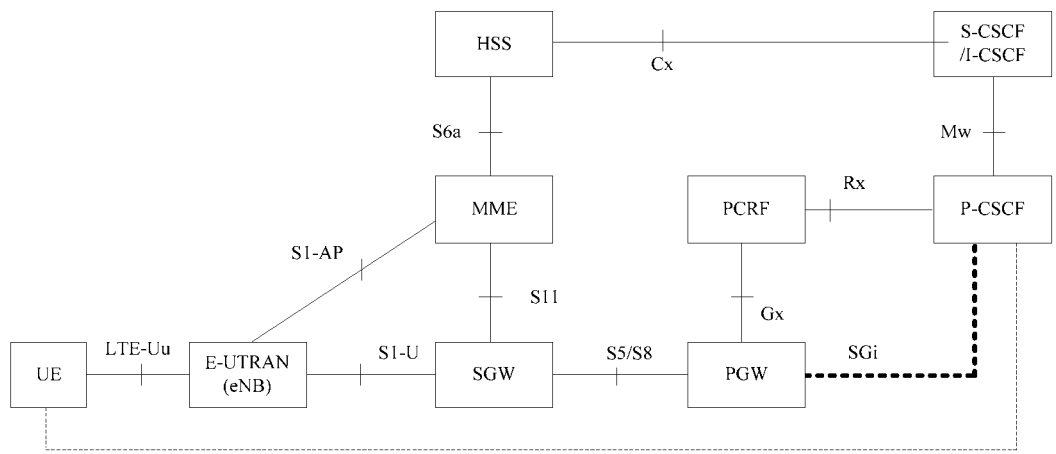
FIG. 1 is an architecture diagram of a 4G system supporting an IMS according to an embodiment.

FIG. 1 is an architecture diagram of a 4G system supporting an IMS according to an embodiment. A radio access network subsystem part, which is also called as evolved universal terrestrial radio access network (E-UTRAN), mainly includes an evolved nodeB (eNodeB). A core network subsystem part, which is also called as evolved packet core (EPC), mainly includes a home subscriber server (HSS), a mobility management entity (MME), a serving gateway (S-GW), a PDN gateway (P-GW), a policy and charging enforcement function (PCRF).

The HSS refers to a permanent storage location for user subscription data and is located at a home network.

A MME refers to a storage location for the current network and is responsible for non-access stratum (NAS) signaling management from a terminal to a network, tracking and paging management function in a user idle mode, and bearer management.

The S-GW refers to a gate from the network to a radio access network, and is responsible for a user plane bearer from the terminal to the core network, data buffering in a terminal idle mode, a network side initiating service request function, legal interception, and a packet data routing and forwarding function.

The P-GW refers to an evolved EPS and a gateway of an external network of this system, and is responsible for functions such as IP address allocation, a charging function, a packet filtering and a strategy application.

The PCRF is responsible for providing policy control and charging rules for the PCEF.

Figure 2:
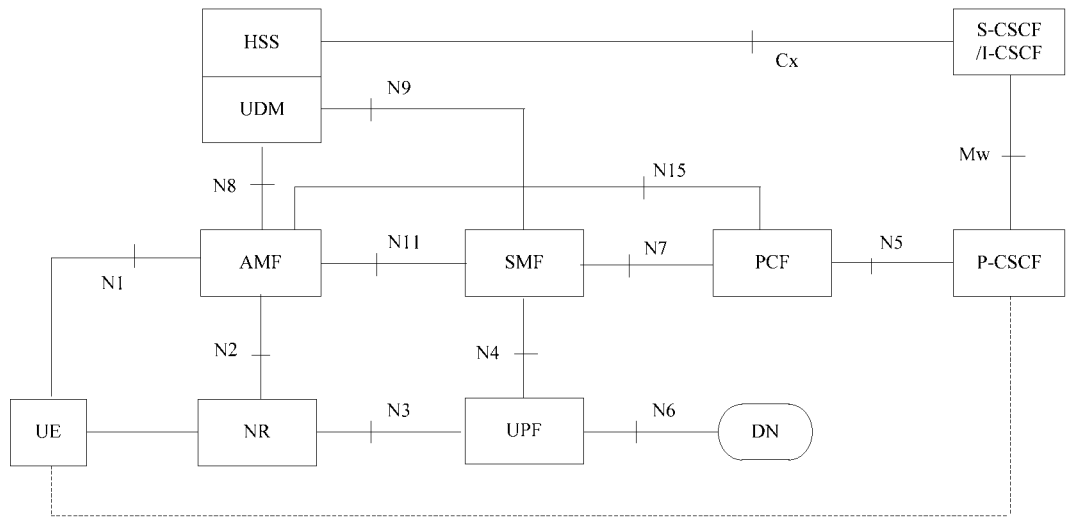
FIG. 2 is an architecture diagram of a 5G system supporting an IMS according to an embodiment.

FIG. 2 is an architecture diagram of a 5G system supporting an IMS according to an embodiment. The radio access network subsystem part mainly includes a new radio (NR) base station. The core network subsystem part, which is also called as a new generation core (NGC) network, mainly includes unified data management (UDM), an access management function (AMF), a session management function (SMF), a user plane function (UPF) and a policy control function (PCF).

The UDM refers to a permanent storage location for user subscription data and is located at a home network.

The AMF manages requirements of user to access the network and is responsible for functions such as the non-access stratum (NAS) signaling management from the terminal to the network and user mobility management.

The SMF manages a packet data unit (PDU) session and a quality of service (QoS) flow of the user, and formulates packet detection and forwarding rules for the UPF.

The UPF is responsible for functions such as routing and forwarding of IP data and non-IP data, and generating usage report.

The PCF is responsible for providing policy rules of each level for the AMF and SMF.

Compared with the 4G system, network functions have been divided and reorganized in the 5G system. The UDM is basically equivalent to the HSS in the 4G system in terms of functions. The AMF is basically equivalent to the MME in the 4G system in terms of functions, but the AMF does not have a session management function. The SMF is basically equivalent to a set of control plane parts in the session management function of the MME, SGW and PGW in the 4G system in terms of functions. The UPF is basically equivalent to a set of user plane management function of the SGW and PGW in the 4G system in terms of functions. Functions of the PCF are basically equivalent to that of the PCRF in the 4G system.

Architectures shown in FIGS. 1 and 2 further include an IMS subsystem part, which mainly includes the HSS and a call session control function (CSCF). The HSS is used for storing the user subscription data of the IMS while the CSCF is a core network element executing session control in the IMS subsystem. The CSCF is further divided into a Proxy-CSCF (P-CSCF), an Interrogating-CSCF (I-CSCF) and a serving-CSCF (S-CSCF).

During implementing an IMS call process, the IMS network element is considered to be re-selected after the failure. In particular, the P-CSCF failure makes it impossible to send a terminating call request to the UE.

Figure 3:
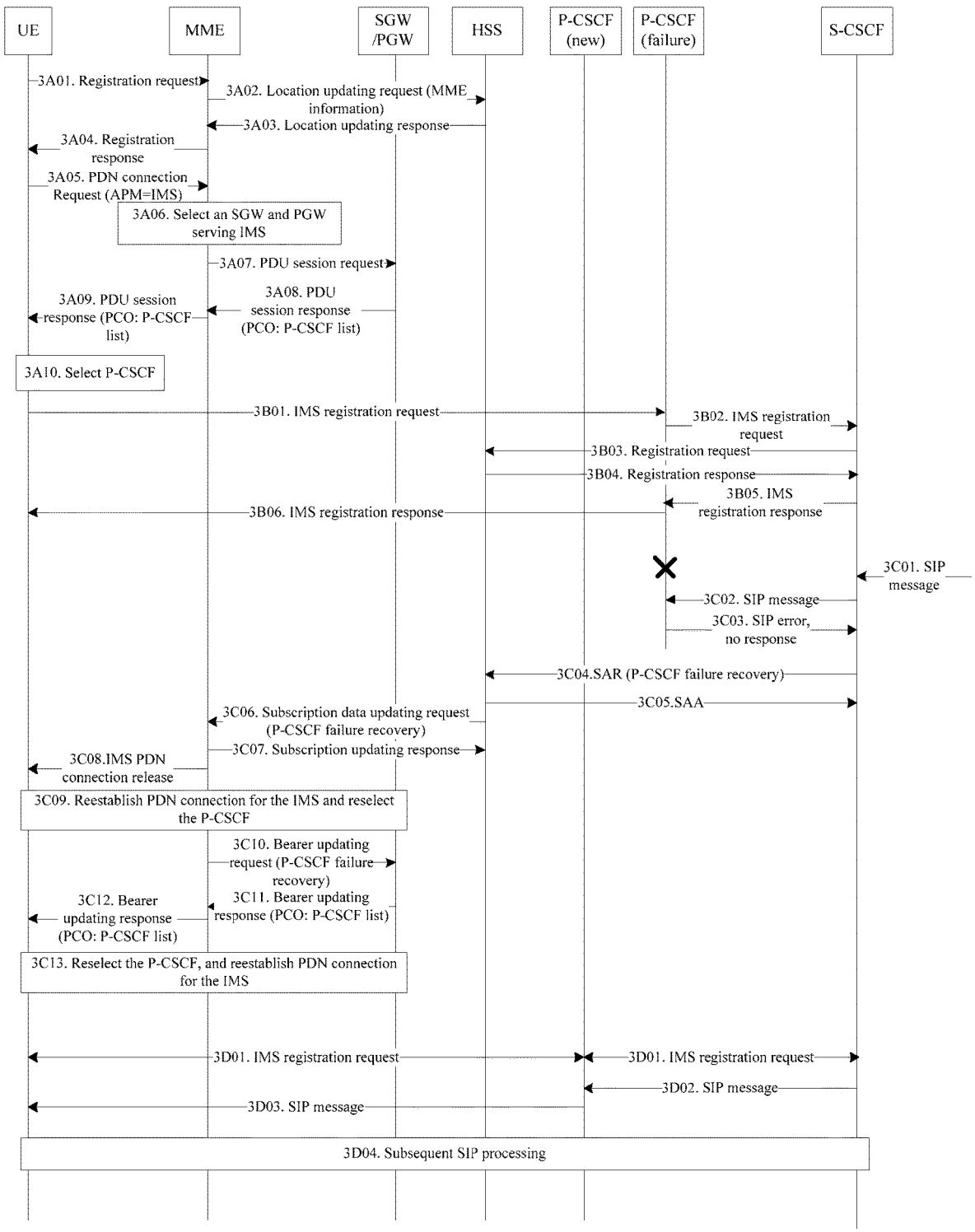
FIG. 3 is a flowchart of triggering to reselect a P-CSCF after a P-CSCF failure according to an embodiment.

To solve this problem, in the 4G system, a process of triggering to reselect the P-CSCF in case of the P-CSCF failure after the UE is attached to an EPS network and successfully performs the IMS registration is defined, as shown in FIG. 3. FIG. 3 is a flowchart of triggering to reselect the P-CSCF after the P-CSCF failure according to an embodiment. In one embodiment, FIG. 2 includes a data network (DN).

In process as shown in FIG. 3, after the UE is attached to the EPS network and establishes a PDN connection for the IMS and successfully performs the IMS registration, when the S-CSCF receives a downlink SIP message, the P-CSCF failure is detected and P-CSCF detection is triggered. The process includes steps described below.

(1) In steps 3A01 to 3A10, the UE is attached to the EPS network, establishes the PDN connection for the IMS and obtains the P-CSCF for the IMS registration, In step 3A01, the UE sends an attach request to the MME.

In step 3A02, after the MME receives the attach request of the UE, the MME sends a location updating request to the HSS.

In step 3A03, the HSS registers information of the MME serving the UE, returns a location updating response, which carries subscription data of the UE, to the MME.

The subscription data of the UE includes authentication information of the UE. The MME performs authentication on the UE. If the UE is allowed to register, the MME sends a registration success response to the UE; otherwise, the MME sends a registration rejection response.

The subscription data of the UE may also include a defailure access point name (APN), according to which the MME may establish a default PDN connection for the UE.

In step 3A04, the UE is attached to network successfully, and the MME sends an attach success response to the UE.

In step 3A05, when the UE needs to use an IMS service, the UE initiates a PDN connection request to the MME, and establishes the PDN connection specific for IMS.

In this step, the UE sets the APN to "IMS", that is, APN="IMS" means to request to establish the PDN connection specific for IMS.

In step 3A06, the MME selects, according to the location and other information of the UE, the SGW and PGW supporting the IMS service for the UE.

In step 3A07, the MME sends a PDN connection establishment request, which carries the APN used for the IMS, to the SGW/PGW.

In step 3A08, the SGW/PGW establishes the PDN connection specific for IMS for the UE, and returns a PDN connection establishment response, which carries a P-CSCF list, to the MME.

In this step, the P-CSCF list is included in a protocol control object (PCO). The PCO is used for interacting protocol control information between the PGW and the UE, and such PCO is transparent to the MME.

In step 3A09, the MME forwards a PDN connection response, which carries the P-CSCF list, to the UE.

In step 3A10, after the UE receives the PDN connection response, the UE selects a certain P-CSCF from the retrieved P-CSCF list for the IMS registration.

(2) In steps 3B01 to 3B06, after the UE selects the P-CSCF, the UE initiates the IMS registration.

In step 3B01, the UE initiates an IMS registration request to the P-CSCF. In this step, the IMS registration request is an initial IMS registration request.

In step 3B02, the P-CSCF forwards the initial IMS registration request to the S-CSCF.

In step 3B03, the S-CSCF sendssends a server-assignment-registered (SAR) request to the HSS.

In step 3B04, the HSS returns a server-assignment-answer (SAA), which carries IMS subscription data of the UE, to the S-CSCF.

In step 3B05, the S-CSCF processes the IMS registration request of the UE according to the subscription data of the UE, and returns an IMS registration response to the P-CSCF.

In step 3B06, the P-CSCF forwards the IMS registration response to the UE.

After the UE successfully executes the IMS registration, a security association is established between the UE and the P-CSCF. The P-CSCF will register address information of an S-CSCF, the S-CSCF also registers address information of the P-CSCF, thereby achieving unobstructed paths of a initiating call session from the UE and a terminating call session to the UE.

(3) In steps 3C01 to 3C11, when the S-CSCF receives the downlink SIP message, the P-CSCF fails, and a P-CSCF reselection process is triggered.

In step 3C01, the S-CSCF receives the downlink SIP message, which may be an SIP session request or an SIP instant message.

In step 3C02, the S-CSCF sends an SIP message to the P-CSCF in the previous IMS registration.

In step 3C03, in this process, in a case where the previous P-CSCF fails and does not respond, or loses UE data after failing and restarting, the P-CSCF returns an SIP failure to the S-CSCF.

In step 3C04, the S-CSCF detects the P-CSCF failure, and then sends an SAR request, which carries a P-CSCF failure recovery indication, to an HSS.

In step 3C05, the HSS returns an SAA response to the S-CSCF.

In step 3C06, after the HSS receives the SAR request of the S-CSCF, the HSS sends a subscription data updating request, which carries the P-CSCF failure recovery indication, to the MME.

In step 3C07, the MME sends a subscription data updating response to the HSS.

After the MME receives the P-CSCF failure recovery indication from the HSS, if the UE does not support the P-CSCF failure recovery process based on the PCO, the MME performs the steps 3C08 and 3C09; and if the UE supports the P-CSCF failure recovery based on the PCO, the MME performs steps 3C10 to 3C12.

In step 3C08, the MME sends a PDN connection release request to the UE.

In step 3C09, the UE releases the original PDN connection for IMS and re-requests to establish the PDN connection for the IMS. In this process, the UE re-obtains the P-CSCF list.

In step 3C10, the MME sends a bearer updating request, which carries the P-CSCF failure recovery indication, to the SGW/PGW.

In step 3C11, after receiving the P-CSCF failure recovery indication, the SGW/PGW reselects a P-CSCF for the UE, and sends a bearer updating response, which carries the P-CSCF list included in the PCO, to the MME.

In step 3C12, the MME sends a bearer updating response, which carries the P-CSCF list, to the UE.

In step 3C13, after the steps 3C08 to 3C09 or the steps 3C10 to 3C12, the UE obtains the P-CSCF list, and selects a P-CSCF for reinitiating the IMS registration from the P-CSCF list.

(4) In steps 3D01 to 3D04, the UE initiates the IMS registration by using the new P-CSCF, and the S-CSCF continues to deliver the downlink SIP message.

In step 3D01, the UE initiates an IMS registration process by using a reselected P-CSCF.

In this step, after the IMS registration process succeeds, the connection between the S-CSCF and the P-CSCF is recovered, so that the S-CSCF may forward the downlink SIP message to the new P-CSCF.

In steps 3D02 to 3D03, after the IMS registration process succeeds, the S-CSCF re-forwards the SIP message received in the step 3C01 to the new P-CSCF, and the P-CSCF forwards the SIP message to the UE.

In step 3D04, after receiving the SIP message, the UE continues subsequent processing.

The process shown in FIG. 3 is applied to the P-CSCF failure recovery under the condition that the UE is accessed to an IMS the 4G system, and is able to solve the problem of reselecting the P-CSCF after the P-CSCF failure recovers in a terminating call case.

However, the scheme is used in the 5G system and is not sufficiently optimized yet. In the case of accessing the 5G system, after the UE is registered on the 5G network and a PDU connection is established, both the AMF (which is basically equivalent to the MME in the 4G system) and the SMF (which is equivalent to a set of control plane functions of the SGW and the PGW in the 4G system) are registered on the UDM. In this case, the UDM triggers the SMF via the AMF to re-send the P-CSCF list to the UE, which is not sufficiently optimized yet.

Embodiment 1

Figure 4:
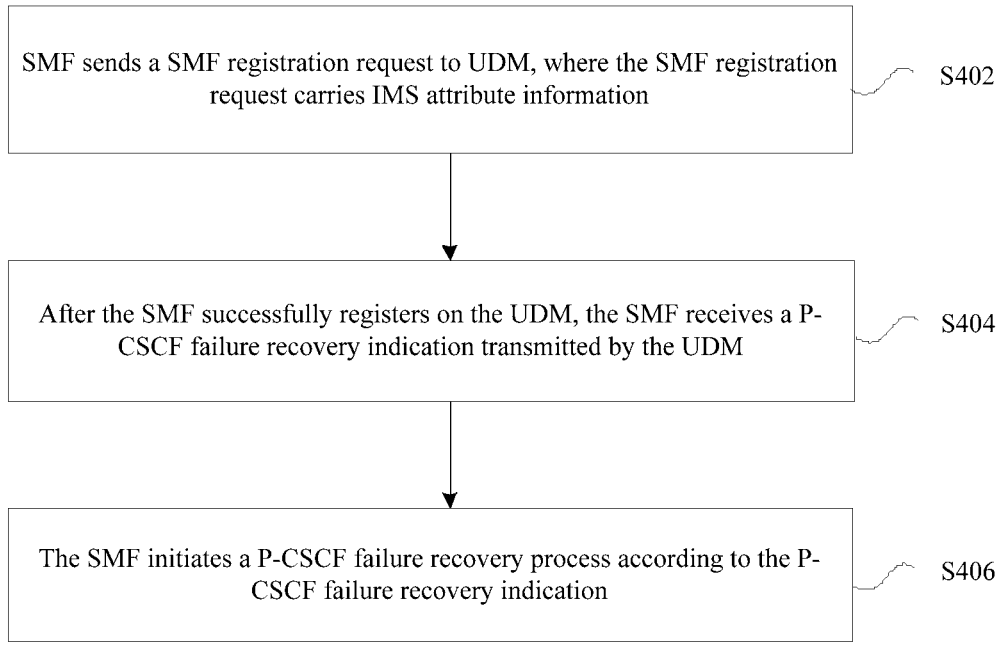
FIG. 4 is a flowchart of a P-CSCF failure recovery method according to an embodiment of the present disclosure.

This embodiment provides a P-CSCF failure recovery method. FIG. 4 is a flowchart of a P-CSCF failure recovery method according to an embodiment of the present disclosure. As shown in FIG. 4, the process of the method includes the steps described below.

In step S402, a SMF sends a SMF registration request to UDM, where the SMF registration request carries Internet protocol multimedia core network subsystem (IMS) attribute information.

In step S404, after the SMF successfully registers on the UDM, the SMF receives a P-CSCF failure recovery indication sent by the UDM.

In step S406, the SMF initiates, according to the P-CSCF failure recovery indication, a P-CSCF failure recovery process.

Through the above steps, the problem of complexity in the process of triggering the P-CSCF failure recovery process through an AMF in the related art is solved, thereby simplifying the process and more rapidly recovering the IMS service.

In one embodiment, the above steps may, but may not necessarily, be executed by a SMF.

In one embodiment, the IMS attribute information includes at least one of: a DNN indicating IMS, an IMS support indication or an IMS failure recovery support indication. The DNN indicating the IMS (i.e., the DNN indicates the IMS) represents that a PDU connection specific for IMS service, the IMS support indication represents that the SMF supports the IMS service, and the IMS failure recovery support indication represents that the SMF supports the P-CSCF failure recovery procedure.

In one embodiment, the step in which the SMF initiates, according to the P-CSCF failure recovery indication, the P-CSCF failure recovery process includes that the SMF sends, according to the P-CSCF failure recovery indication, a PDU connection change request to the UE. The PDU connection change request carries an updated P-CSCF address list, the updated P-CSCF address list is used for the UE to reselect a P-CSCF to initiate an IMS registration process. In one embodiment, the PDU connection change request includes one of: a PDU connection release request or a PDU connection updating request.

In one embodiment, the P-CSCF failure recovery process includes that the process of reselecting the P-CSCF is triggered through the SMF.

In one embodiment, the step in which the UDM selects a specified SMF according to SMF registration information includes: after the UDM receives the P-CSCF failure recovery indication, the UDM selects the specified SMF according to the SMF registration information.

Figure 5:
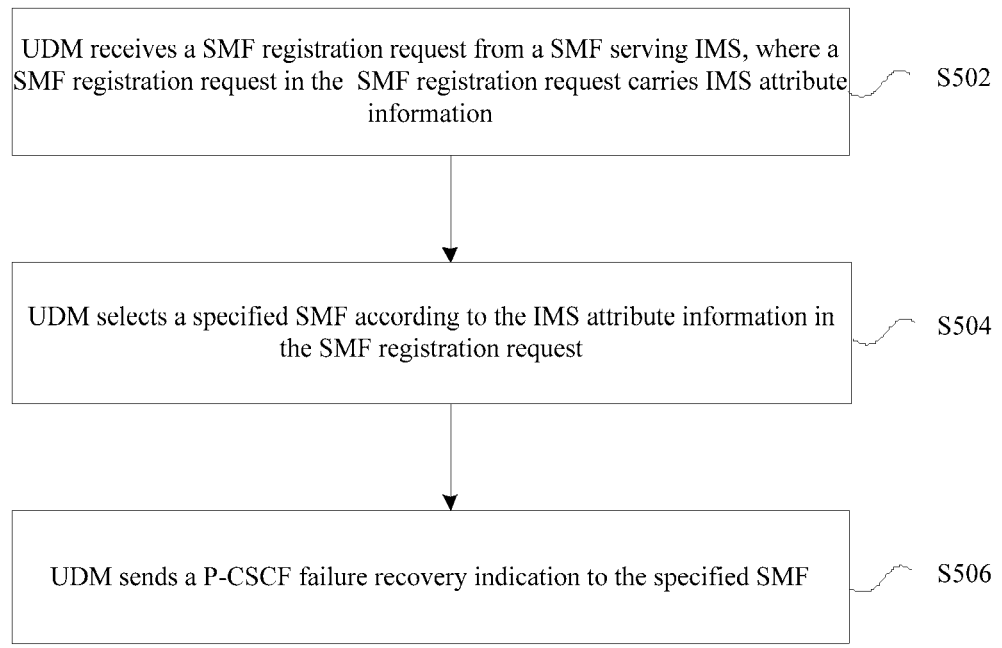
FIG. 5 is a flowchart of a P-CSCF failure recovery method according to another embodiment of the present disclosure.

This embodiment provides another P-CSCF failure recovery method. FIG. 5 is a flowchart of a P-CSCF failure recovery method according to another embodiment of the present disclosure. As shown in FIG. 5, the process of the method includes the steps described below.

In step S502, UDM receives at least one SMF registration request from the SMF serving IMS, where one of the SMF registration requests carries IMS attribute information.

UMD may receive SMF registration request from more than one SMF, however only the SMF serving IMS carries IMS attribute information in the SMF registration request.

In step S504, the UDM selects a specified SMF, according to the IMS attribute information in the SMF registration request.

In step S506, the UDM sends a P-CSCF failure recovery indication to the specified SMF, to enable the SMF to initiate a P-CSCF failure recovery process according to the P-CSCF failure recovery indication.

The UDM is able to determine to send a P-CSCF failure recovery indication to which SMF of the multiple SMFs serving UE, and the UDM may directly trigger the SMF to initiate a P-CSCF failure recovery process without the use of an AMF. So that when the UE implements the IMS service through accessing the 5G system, the P-CSCF failure recovery process is triggered through an improved scheme, thereby simplifying the process and more rapidly recovering the IMS service.

In one embodiment, the IMS attribute information includes at least one of: a data network name (DNN) indicating IMS, an IMS support indication or an IMS failure recovery support indication (i.e., an IMS failure recovery ability indication). The DNN indicating the IMS represents that a packet data unit (PDU) session supports an IMS service, the IMS support indication represents that the SMF supports the IMS service, and the IMS failure recovery support indication represents that the SMF supports the P-CSCF failure recovery process.

In one embodiment, the step in which the UDM selects the specified SMF according to the IMS attribute information in the SMF registration request includes that the UDM determines, according to the IMS attribute information in the SMF registration request, a SMF serving for the IMS service as the specified SMF. In another implementation mode, when the UDM fails in determining the specified SMF according to the IMS attribute information in the SMF registration request, the UDM sends the P-CSCF failure recovery indication to each SMF of multiple SMFs.

In one embodiment, the registration on the multiple SMFs includes:

information of the at least one SMF is registered, where the information includes names or addresses of the multiple SMFs.

In one embodiment, the specified SMF includes one of:

a SMF with the DNN indicating the IMS, having the IMS support indication and having the IMS failure recovery support indication; or a SMF with the DNN indicating the IMS and having the IMS support indication; or a SMF with the DNN indicating the IMS and having the IMS failure recovery indication. In consideration of providing the IMS failure recovery support indication by the SMF, it means that the SMF supports the IMS, the SMFs may not carry the IMS support indication; or a SMF with the DNN indicating the IMS; or a SMF having the IMS support indication; or a SMF having the IMS failure recovery support indication; or a SMF specified by an operator of the IMS service.

In one embodiment, the step in which the UDM selects the specified SMF from all SMFs registered on the UDM includes:

after receiving the P-CSCF failure recovery indication, the UDM selects the specified SMF according to information of the SMFs registered in the UDM.

From the description of the embodiment described above, it will be apparent to those skilled in the art that the method in the embodiment described above may be implemented by software plus a general-purpose hardware platform, or may of course be implemented by hardware. However, in many cases, the former is a preferred implementation mode. Based on such understanding, the solution provided by the present disclosure may be embodied in the form of a software product. The computer software product is stored in a non-transient storage medium (such as a read-only memory (ROM), a random-access memory (RAM), a magnetic disk or an optical disk) and the storage medium includes multiple instructions for enabling a terminal device (which may be a mobile phone, a computer, a server, or a network device) to execute the method described in the embodiments of the present disclosure.

Embodiment 2

This embodiment further provides a P-CSCF failure recovery apparatus. The apparatus is configured to implement the above-mentioned embodiments and implementation modes. What has been described will not be repeated. As used below, a term "module" may be software, hardware or a combination thereof capable of implementing predetermined functions. The apparatus in the embodiment described below is preferably implemented by software, but implementation by hardware or by a combination of software and hardware is also possible and conceived.

Figure 6:
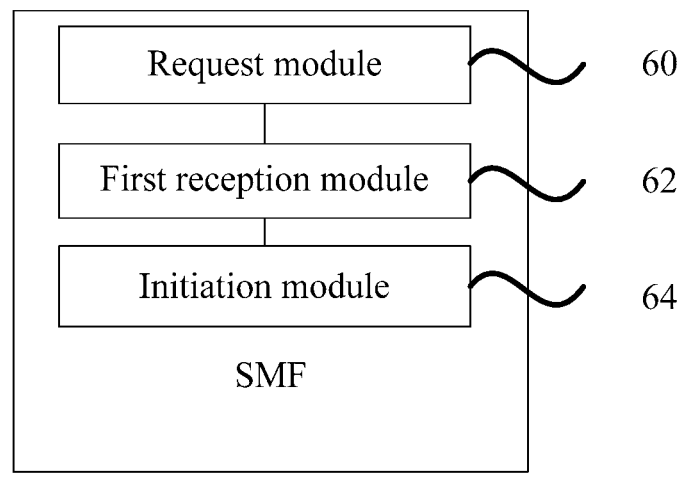
FIG. 6 is a block diagram of a P-CSCF failure recovery apparatus according to an embodiment of the present disclosure.

FIG. 6 is a block diagram of a P-CSCF failure recovery apparatus according to an embodiment of the present disclosure. As shown in FIG. 6, the apparatus is applied to a SMF and includes a request module 60, a first reception module 62 and an initiation module 64.

The request module 60 is configured to send a SMF registration request to UDM, where the SMF registration request carries Internet protocol multimedia core network subsystem (IMS) attribute information;

The first reception module 62 is configured to receive, after the SMF successfully registers on the UDM, a P-CSCF failure recovery indication sent by the UDM.

The initiation module 64 is configured to initiate, according to the P-CSCF failure recovery indication, a P-CSCF failure recovery process.

In one embodiment, the IMS attribute information includes at least one of: a data network name (DNN) indicating an IMS, an IMS support indication or an IMS failure recovery support indication. The DNN indicating the IMS represents that a packet data unit (PDU) connection specific for IMS service, the IMS support indication represents that the SMF supports the IMS service, and the IMS failure recovery support indication represents that the SMF supports the P-CSCF failure recovery process.

Figure 7:
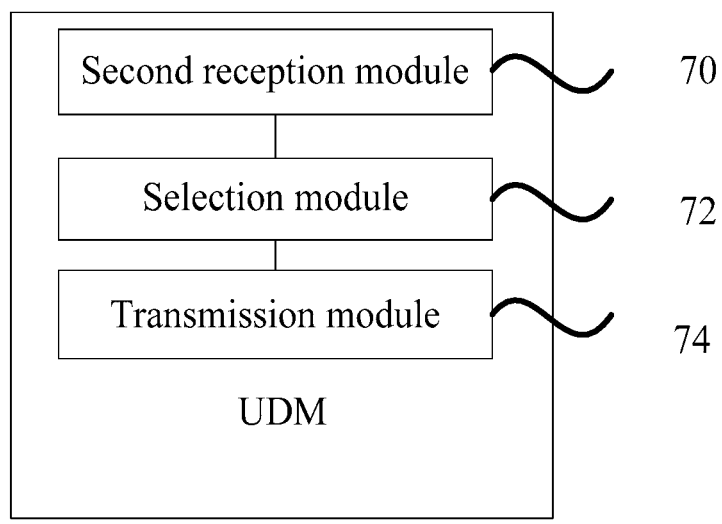
FIG. 7 is a block diagram of a P-CSCF failure recovery apparatus according to another embodiment of the present disclosure.

FIG. 7 is a block diagram of a P-CSCF failure recovery apparatus according to another embodiment of the present disclosure. As shown in FIG. 7, the apparatus is applied to UDM and includes a second reception module 70, a selection module 72 and a transmission module 74.

The second reception module 70 is configured to receive at least one SMF registration request from the SMF serving IMS, where one of the SMF registration requests carries IMS attribute information;

The selection module 72 is configured to select, according to the IMS attribute information in the SMF registration request, a specified SMF.

The transmission module 74 is configured to send a P-CSCF failure recovery indication to the specified SMF, to enable the SMF to initiate a P-CSCF failure recovery process according to the P-CSCF failure recovery indication.

In one embodiment, the IMS attribute information includes at least one of: a data network name (DNN) indicating an IMS, an IMS support indication or an IMS failure recovery support indication. The DNN indicating the IMS represents that a packet data unit (PDU) connection specific for IMS service, the IMS support indication represents that the SMF supports the IMS service, and the IMS failure recovery support indication represents that the SMF supports the P-CSCF failure recovery process.

Figure 8:
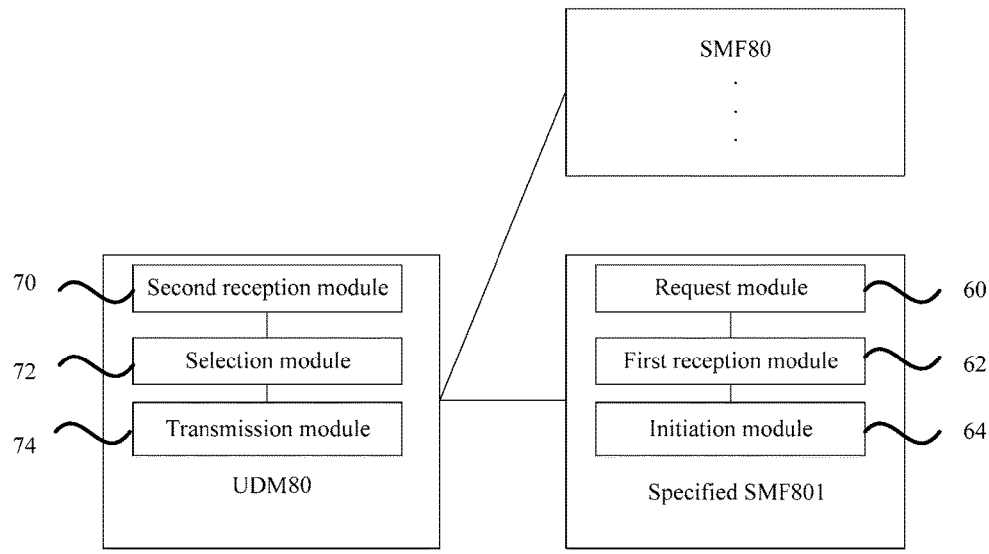
FIG. 8 is a block diagram of a P-CSCF failure recovery system according to an embodiment of the present disclosure.

FIG. 8 is a block diagram of a P-CSCF failure recovery system according to an embodiment of the present disclosure. As shown in FIG. 8, the system includes: UDM 80 and multiple SMFs 80. The multiple SMFs 80 at least include a specified SMF 801. Each SMF 80 executes the method applied to a SMF side, and the UDM 80 executes the method applied to a UDM side.

In one embodiment, the specified SMF 801 includes a request module 60, a first reception module 62 and an initiation module 64.

The request module 60 is configured to send a SMF registration request to UDM, and the SMF registration request carries Internet protocol multimedia core network subsystem (IMS) attribute information.

The first reception module 62 is configured to receive, after the SMF successfully registers on the UDM, a P-CSCF failure recovery indication sent by the UDM.

The initiation module 64 is configured to initiate, according to the P-CSCF failure recovery indication, a P-CSCF failure recovery process.

In one embodiment, the UDM 80 includes a second reception module 70, a selection module 72 and a transmission module 74.

The second reception module 70 is configured to receive at least one SMF registration request from the SMF serving IMS, where one of the SMF registration requests carries IMS attribute information.

The selection module 72 is configured to select, according to the IMS attribute information in the SMF registration request, a specified SMF.

The transmission module 74 is configured to send a P-CSCF failure recovery indication to the specified SMF, to enable the SMF to initiate a P-CSCF failure recovery process according to the P-CSCF failure recovery indication.

In one embodiment, the IMS attribute information includes at least one of: a data network name (DNN) indicating an IMS, an IMS support indication or an IMS failure recovery support indication. The DNN indicating the IMS represents that a packet data unit (PDU) connection specific for IMS service, the IMS support indication represents that the SMF supports the IMS service, and the IMS failure recovery support indication represents that the SMF supports the P-CSCF failure recovery process.

In one embodiment, the various modules described above may be implemented by software or hardware. Implementation by hardware may, but may not necessarily, be performed in the following manners: one or more modules described above are located in a same processor or their respective processors.

Embodiment 3

This embodiment is an optional embodiment of the present disclosure. Illustration and description of the present disclosure is given below in conjunction with specific implementation modes.

In this embodiment, in a case where the UDM is able to determine to send a P-CSCF failure recovery indication to which SMF of the multiple SMFs serving UE, the UDM may directly trigger the SMF to initiate a P-CSCF failure recovery process without the use of an AMF. This embodiment, based on the above consideration, provides a scheme, enabling the P-CSCF failure recovery process to be triggered through an improved scheme when the UE implements an IMS service through accessing the 5G system, thereby simplifying the process and more rapidly recovering the IMS service.

This embodiment provides a method for reselecting P-CSCF for the UE when the P-CSCF fails. The method includes that: the SMF sends a registration request for the UDM, where the registration request carries IMS attribute information; after receiving the P-CSCF failure recovery indication, the UDM selects a SMF and sends the P-CSCF failure recovery indication to the SMF.

In one embodiment, the IMS attribute information is one of or a combination of:

a DNN pointing to an IMS, an IMS support indication or an IMS failure recovery indication.

In one embodiment, the step of selecting the SMF to send the P-CSCF failure recovery indication may be: selecting a SMF serving the IMS according to SMF registration information, and sends the P-CSCF failure recovery indication to the SMF.

In one embodiment, the step of selecting the SMF to send the P-CSCF failure recovery indication may be: if it is impossible to determine the SMF serving the IMS according to the SMF registration information, sending the P-CSCF failure recovery indication to each SMF of multiple SMFs.

In one embodiment, after the UDM selects the SMF and sends the P-CSCF failure recovery indication to the SMF, the method further includes that the SMF sends a PDU connection release (updating) request to the UE, in the PDU connection release (updating) request, carries a P-CSCF address list; and the UE selects the P-CSCF in the P-CSCF address list sent by the SMF, and initiates an IMS registration.

This embodiment further provides a SMF having the following features: executing a SMF registration on UDM, carrying IMS attribute information, receiving a P-CSCF failure recovery indication sent by the UDM, and initiating a P-CSCF failure recovery process.

In one embodiment, the IMS attribute information specifically is one of or a combination of: a DNN pointing to IMS, an IMS support indication or an IMS failure recovery indication.

In one embodiment, initiating the P-CSCF failure recovery process may be: sending a PDU connection release (updating) request, which carries a P-CSCF address list, to the UE. Then the UE selects the P-CSCF in the P-CSCF address list sent by the SMF, and initiates an IMS registration.

This embodiment further provides UDM having the following features: receiving a SMF registration, which carries IMS attribute information; selecting a SMF according to SMF registration information and sends a P-CSCF failure recovery indication to the SMF.

In one embodiment, the IMS attribute information specifically is one of or a combination of: a DNN pointing to an IMS, an IMS support indication or an IMS failure recovery indication.

In one embodiment, the step of selecting the SMF to send the P-CSCF failure recovery indication may be: selecting a SMF serving the IMS according to SMF registration information, and sending the P-CSCF failure recovery indication to the SMF.

In one embodiment, the step of selecting the SMF to send the P-CSCF failure recovery indication may be: if it is impossible to determine the SMF serving the IMS according to the SMF registration information, sending the P-CSCF failure recovery indication to multiple SMFs.

The embodiment further includes multiple implementation modes as described below.

Figure 9:
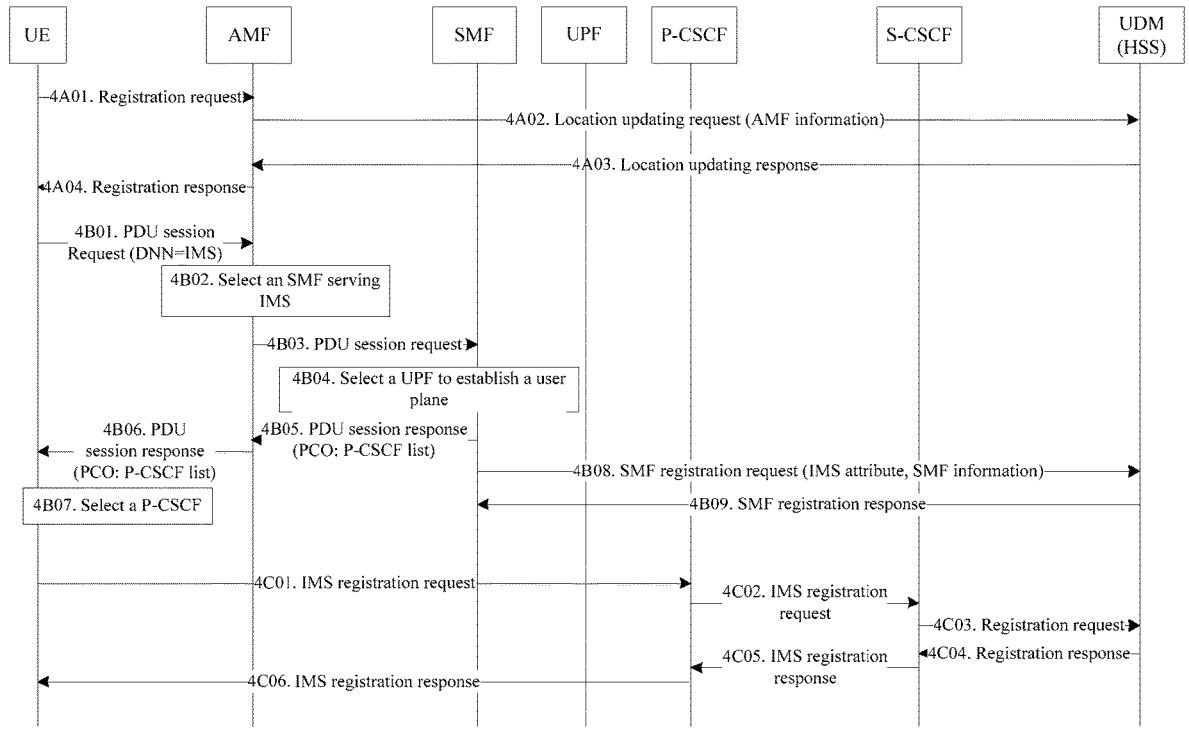
FIG. 9 is a flowchart of implementation mode one.

Implementation Mode One:

FIG. 9 is a flowchart of implementation mode one, and is used for the UE accessing a 5G system. After requesting to establish a PDU connection used for the IMS, the SMF registers its IMS support information on UDM.

FIG. 9 includes the steps described below.

(1) In steps 4A01 to 4A04, the UE registers on a 5G network.

In step 4A01, the UE sends a registration request to an AMF.

In step 4A02, after the AMF receives the registration request of the UE, the AMF sends a AMF registration request to the UDM.

In step 4A03, the UDM registers AMF information serving the UE, returns a AMF registration response which carries subscription data of the UE to AMF.

The subscription data of the UE includes authentication information of the UE. The AMF performs authentication on the UE. If the UE is allowed to register, the AMF sends a registration success response to the UE; otherwise, the AMF sends a registration rejection response.

The subscription data of the UE may further include a default DNN, and the role of the DNN is similar to an APN in the 4G system. According to the default DNN, the AMF may establish a default PDU connection for the UE.

In step 4A04, the UE successfully registers; the AMF sends the registration success response to the UE.

(2) The UE requests to establish the PDU connection for the IMS.

In step 4B01, when the UE needs to use an IMS service, the UE initiates a PDU connection request to a network, and establishes the PDU connection for the IMS.

Usually, when the UE requests to establish the PDU connection serving the IMS, the UE uses a DNN indicating to serve the IMS, i.e., the UE configures the DNN as "IMS", i.e., DNN="IMS". However, other DNNs with local configurations used by some operators to implement the IMS service is not excluded.

In step 4B02, the AMF selects, according to a position and other conditions of the UE, a SMF supporting the IMS service for the UE.

In step 4B03, the AMF sends a PDU connection establishment request, which carries the DNN used for the IMS, to the SMF.

In step 4B04, the SMF selects, according to the location and other information of the UE, a UPF supporting the IMS service for the UE, establishes a connection with the UPF, and instructs the UPF to establish a default user plane resource for the PDU connection.

In step 4B05, the SMF establishes the PDU connection for the IMS for the UE, returns a PDU connection establishment response, which carries a P-CSCF list included in a PCO, to the AMF.

In step 4B06, the AMF forwards a PDU connection response, which carries the P-CSCF list, to the UE.

In step 4B07, after the UE receives the PDU connection response, the UE selects a certain P-CSCF from the P-CSCF list carried in the PDU connection response for an IMS registration.

In step 4B08, after the step 4B05, the SMF initiates a SMF registration request to the UDM.

In this step, when the SMF sends the SMF registration request to the UDM, the SMF also carries IMS attribute information.

In one embodiment, the IMS attribute information may be one of or a combination of:

(1) a DNN indicating the "IMS";

(2) an IMS support indication, which represents that the SMF supports the IMS service; or (3) an IMS failure recovery support indication, which represents that the SMF supports an IMS failure recovery process, especially for a P-CSCF failure recovery process.

In step 4B09, the UDM registers information of the SMFs and returns a SMF registration response to the SMF.

In this step, the UDM registers the information of the SMFs which usually includes a SMF name or a SMF address. And the UDM saves the IMS attribute information provided by the SMF in the information of the SMFs.

Usually, the UE may request to establish multiple PDU connections, one PDU connection is applied to the IMS, and other PDU connections may be applied to normal network services or location services. Each time the UE establishes a PDU connection to a SMF, the SMF will register its own information on the UDM.

(3) In steps 4C01 to 4C06, after the UE selects the P-CSCF, the UE initiates the IMS registration.

The process steps 4C01 to 4C06 are basically same with the process shown in FIG. 3.

After the UE successfully executes the IMS registration, a security association is established between the UE and the P-CSCF. The P-CSCF will register address information of an S-CSCF, the S-CSCF also registers address information of the P-CSCF, thereby achieving unobstructed paths of a starting call session initiated by the UE and a terminating call session sending to the UE.

Implementation Mode Two:

After the process shown in FIG. 9 is successfully executed, information of a SMF is stored on UDM. The UDM may select a SMF serving IMS, triggers the SMF to initiate a P-CSCF failure recovery process, as shown in FIG. 10.

Figure 10:
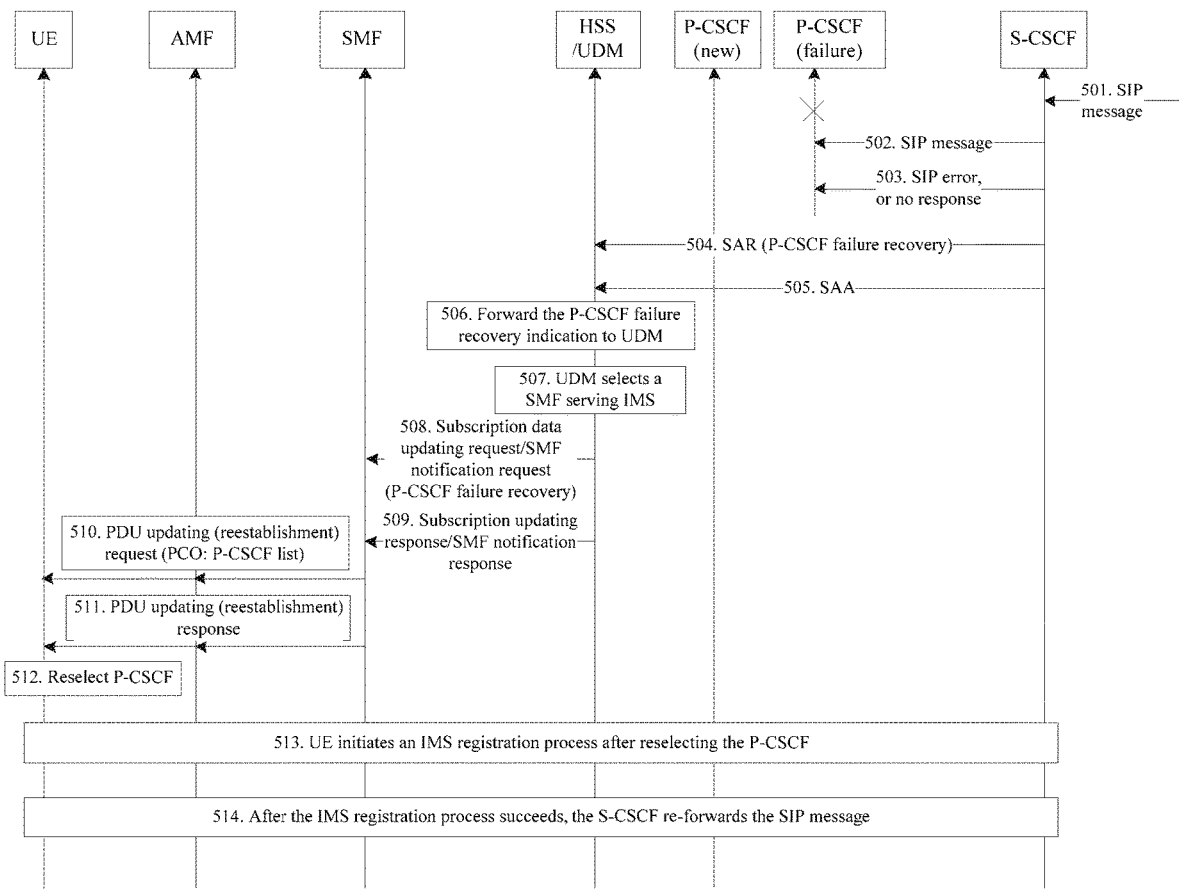
FIG. 10 is a flowchart of implementation mode two.

FIG. 10 is a flowchart of implementation mode two. In the 5G system, when downlink IMS signaling is received, the flowchart of a process of reselecting a P-CSCF is triggered through the SMF.

FIG. 10 includes the steps described below.

In step 501, an S-CSCF receives a downlink SIP message, where the downlink SIP message may be an SIP session request or an SIP instant message.

In step 502, the S-CSCF sends an SIP message to the P-CSCF in a previous IMS registration.

In step 503, in this process, the previous P-CSCF fails and does not respond, or loses UE data after failing and restarting, the P-CSCF returns an SIP failure to the S-CSCF.

In step 504, when the S-CSCF has detected the P-CSCF failure in steps 502 and 503, the S-CSCF sends an SAR request, which carries a P-CSCF failure recovery indication, to an HSS.

In step 505, the HSS returns an SAA response to the S-CSCF.

In step 506, after the HSS receives the SAR request of the S-CSCF, the HSS sends the P-CSCF failure recovery indication to the UDM.

In the present disclosure, the HSS is considered to be an internal logic function part of the UDM, an interaction between the HSS and the UDM is an internal interaction. Alternatively, although the HSS and UDM are different logic functions, they may be interconnected to each other through an internal interface.

In step 507, after the UDM receives the P-CSCF failure recovery indication, the UDM selects a SMF serving the IMS according to information of the SMFs registered on the UDM.

In this step, the UDM selects the SMF serving the IMS from the SMFs registered on the UDM according to the IMS attribute information provided when the SMFs register on the UDM, such as DNN information, an IMS support indication or an IMS failure recovery support indication.

In one embodiment, the UDM may select the SMF in one of the following manners:

(1) selecting a SMF with the DNN indicating the IMS, having the IMS support indication and having the IMS failure recovery indication;

(2) selecting a SMF with the DNN indicating the IMS and having the IMS support indication;

(3) selecting a SMF with the DNN indicating the IMS and having the IMS failure recovery indication;

(4) selecting a SMF only with the DNN indicating the IMS;

(5) selecting a SMF only having the IMS support indication;

(6) selecting a SMF only having the IMS failure recovery indication; and (7) other strategies determined by an operator.

In step 508, the UDM sends a subscription data updating request, which carries the P-CSCF failure recovery indication, to the selected SMF.

In step 509, the SMF sends a subscription data updating response to the UDM.

In step 508, the UDM may also use an SMF notification request message to send the P-CSCF failure recovery indication to the SMF. In step 509, the SMF returns an SMF notification response message to the UDM.

In step 510, after receiving the P-CSCF failure recovery indication from the UDM, the SMF sends a PDU connection release request (or a PDU connection updating request), which carries a P-CSCF list, to the UE. The PDU connection release request (or the PDU connection updating request) is forwarded to the UE by the AMF.

In this step, the P-CSCF list is an available P-CSCF list reselected by the SMF after receiving the P-CSCF failure recovery indication. Usually, the P-CSCF list is included in a PCO cell and is transparent to the AMF.

In step 511, the UE processes the PDU connection release request (or the PDU connection updating request), and returns a PDU connection release response (or a PDU connection updating response) to the SMF. The PDU connection release response (or the PDU connection updating response) is forwarded to the UE by the AMF.

In step 512, after receiving the P-CSCF list from the SMF, the UE selects a P-CSCF from the list for an IMS re-registration.

In step 513, the UE initiates an IMS registration process through a reselected P-CSCF. After the IMS registration process succeeds, the connection between the S-CSCF and the P-CSCF is recovered, so that the S-CSCF may forward the downlink SIP message to the new P-CSCF.

In step 514, after the IMS registration process succeeds, the S-CSCF re-forwards the SIP message received in the foregoing step to the new P-CSCF, and the P-CSCF forwards the SIP message to the UE. After receiving the SIP message, the UE continues the subsequent processing.

Implementation Mode Three:

In the process shown in FIG. 10, UDM may determine which SMF serves IMS according to the stored SMF information, thereby selecting a correct SMF, and triggering the SMF to initiate the P-CSCF failure recovery process.

In some cases, UE does not necessarily use a well-defined DNN to establish a PDU connection for the IMS. The UDM may not necessarily identify which SMF serves IMS according to the DNN. On the other hand, if the SMF does not provide the IMS attribute information when registering on the UDM, the UDM is unable to identify which SMF serves IMS according to IMS attribute information of the SMF.

Figure 11:
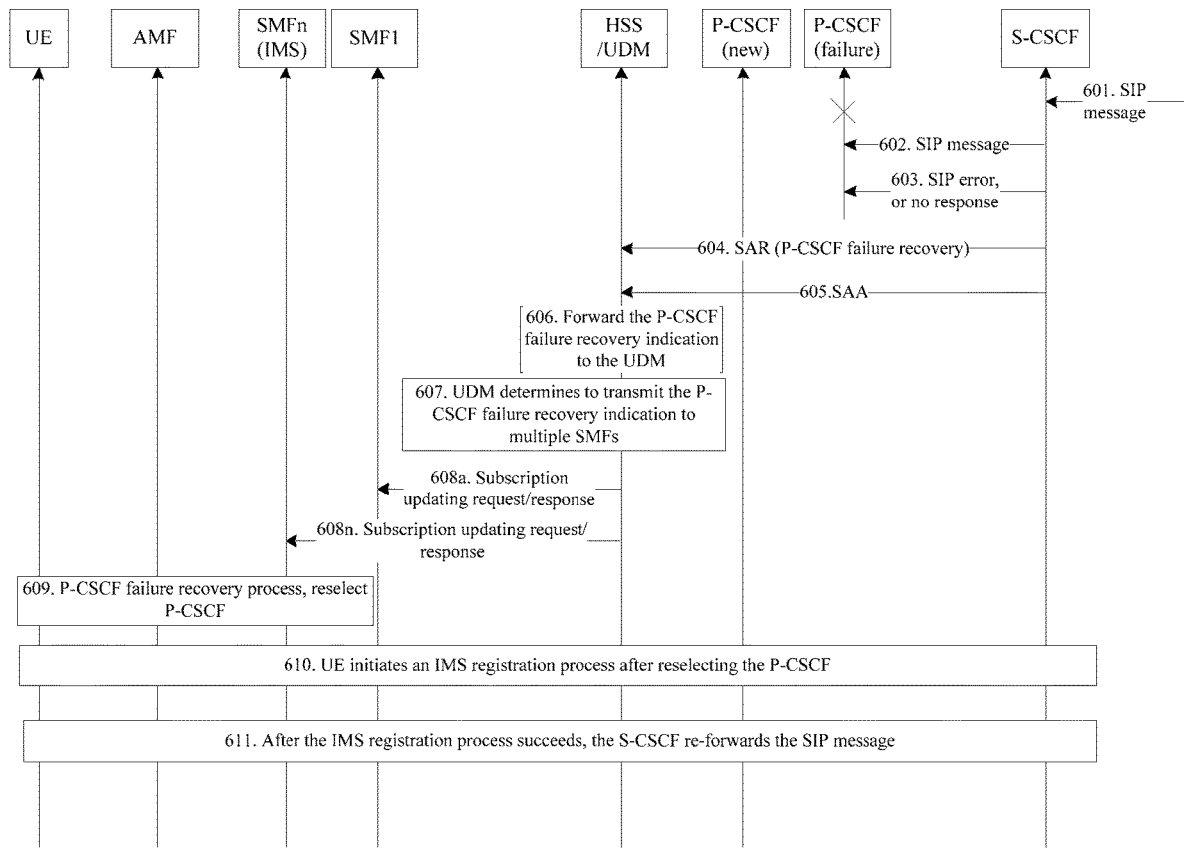
FIG. 11 is a flowchart of implementation mode three.

FIG. 11 is a flowchart of implementation mode three. When multiple SMFs register on the UDM, but the UDM is unable to determine which SMF sends a P-CSCF failure recovery indication according to information registered by the SMF, the UDM may sends the P-CSCF failure recovery indication to the multiple SMFs at the same time.

FIG. 11 includes the steps described below.

In steps 601 to 605, similar to the steps 501 to 505 shown in FIG. 10, when an S-CSCF receives a downlink SIP message and detects an original P-CSCF failure, the S-CSCF triggers a P-CSCF failure recovery process to an HSS.

In step 606, after the HSS receives an SAR request of the S-CSCF, the HSS sends the P-CSCF failure recovery indication to the UDM.

In step 607, after the UDM receives the P-CSCF failure recovery indication, the UDM determines to send the P-CSCF failure recovery indication to the multiple SMFs.

In this embodiment, it is assumed that the UE requests to establish multiple PDU connections, then multiple SMFs are registered on the UDM. Assuming that all the SMFs do not register IMS attribute information on the UDM, the UDM is unable to select a determined SMF for sending the P-CSCF failure recovery indication according to registration information of the SMF, and the UDM decides to send the P-CSCF failure recovery indication to all the registered SMFs.

In step 608*a*/608*b*, the UDM sends a subscription data updating request, which carries the P-CSCF failure recovery indication, to the multiple SMFs, and the SMFs each return a subscription data updating response to the UDM.

In step 608*a*/608*b*, the UDM may also use an SMF notification request message to send the P-CSCF failure recovery indication to the SMFs, and then the SMFs each return an SMF notification response message to the UDM.

In this embodiment, it is assumed that an SMFn currently serves the IMS, and the SMFn performs the subsequent P-CSCF failure recovery process.

In step 609, the SMFn performs the subsequent P-CSCF failure recovery process, as shown in the above process in FIG. 10.

In step 610, the UE initiates an IMS registration process through a reselected P-CSCF.

In step 611, after the IMS registration process succeeds, the S-CSCF re-forwards the SIP message received in the foregoing step to the new P-CSCF, and the P-CSCF forwards the SIP message to the UE. After receiving the SIP message, the UE continues the subsequent processing.

Implementation Mode Four:

In the process shown in FIGS. 10 and 11, UDM sends a P-CSCF failure recovery process to an SMF under a basic condition that the SMF is designed to provide a stateful service, i.e., a UE context on the SMF is stored on the SMF, so that when the UDM sends the P-CSCF failure recovery indication, the SMF may initiate a PDU connection updating/reestablishment process to the UE according to the stored UE context, thereby triggering the UE to reselect the P-CSCF.

In 5G, the SMF may be designed to provide a stateless service, i.e., the SMF stores the UE context in a database, and even in the UDM. If the SMF store the UE context in the UDM, the UDM may select other SMFs (instead of the SMF serving the IMS originally) to send the P-CSCF failure recovery indication to the UE.

Figure 12:
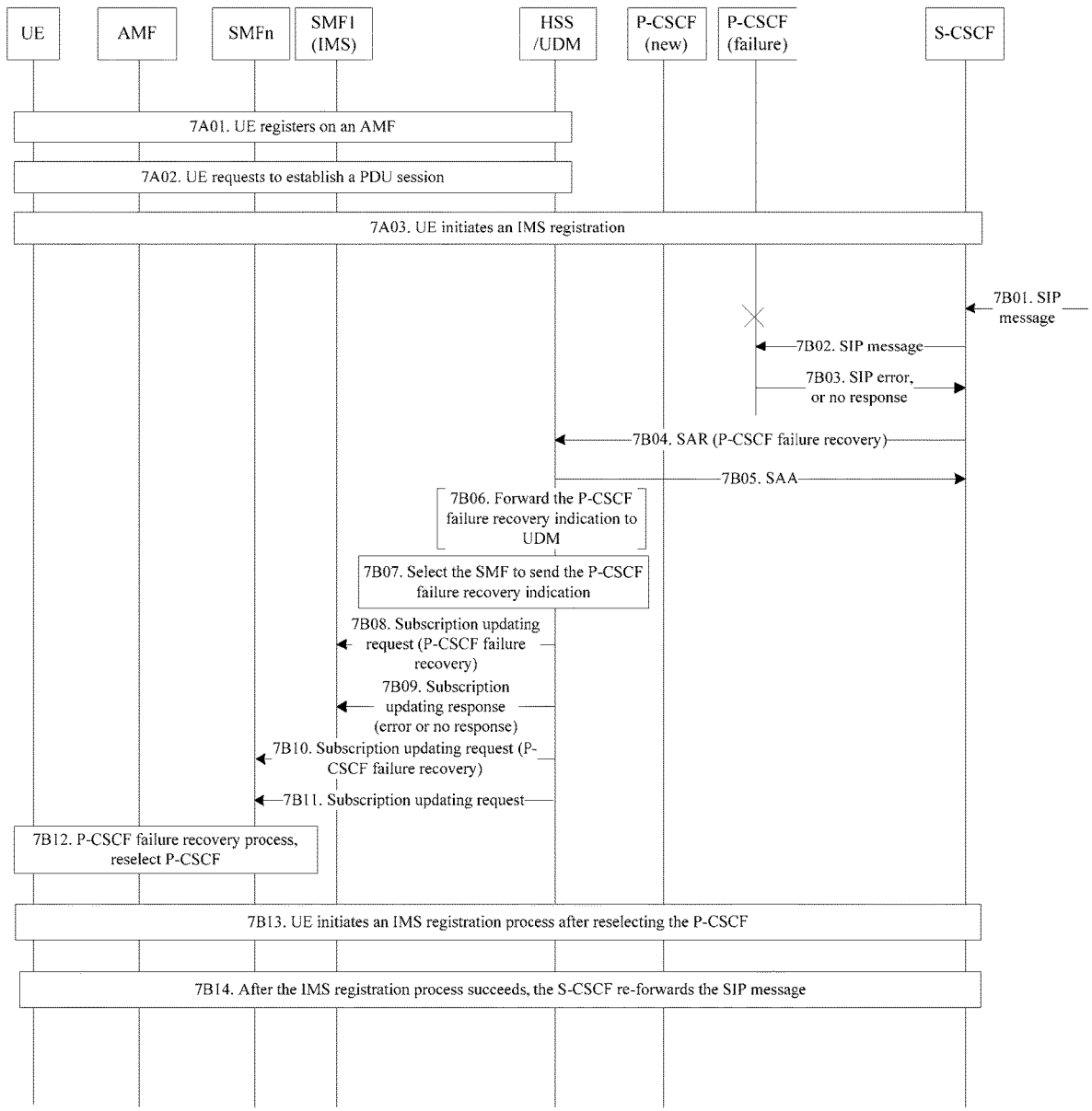
FIG. 12 is a flowchart of implementation mode four.

FIG. 12 is a flowchart of implementation mode four. When the SMFs are registered on the UDM, the SMFs store UE context in the UDM. The UDM may select any appropriate SMF to send the P-CSCF failure recovery indication to the UE.

FIG. 12 includes the steps described below.

In step 7A01, UE registers on an AMF.

In step 7A02, the UE requests to establish a PDU connection serving IMS.

In this step, assuming that an SMF serving the IMS is SMF1, when the SMF1 initiates an SMF registration to the UDM, the SMF provides IMS attribute information and stores the UE context in the UDM.

In step 7A03, the UE selects a P-CSCF and initiates an IMS registration.

In steps 7B01 to 7B06, as shown in the above process, after an S-CSCF receives a downlink SIP message and detects that an original P-CSCF fails, the S-CSCF triggers a P-CSCF failure recovery process to an HSS. The HSS sends a P-CSCF failure recovery indication to the UDM.

In step 7B07, after the UDM receives the P-CSCF failure recovery indication, the UDM selects the SMF and send the P-CSCF failure recovery indication to the SMF.

In this step, the UDM selects the SMF serving the IMS, i.e., selecting SMF1.

In steps 7B08 and 7B09, the UDM sends a subscription data updating request to the SMF1, the request carries the P-CSCF failure recovery indication. If the SMF1 fails, the SMF1 returns an error or makes no response.

In this embodiment, it is assumed that the SMF1 loses the context, or fails and makes no response.

In steps 7B10 and 7B11, the UDM reselects an SMF from multiple SMFs on which the UE is registered. Assuming that the SMF is an SMFn, and a subscription data updating request is sent to the SMFn. The subscription data updating request carries the P-CSCF failure recovery indication, and the UE context saved on the UDM by the SMF1. The SMFn returns a subscription data updating response to the UDM.

In steps 7B08 to 7B09 and 7B10 to 7B11, the UDM may also use an SMF notification request message to send the P-CSCF failure recovery indication to the SMF, and then the SMF returns an SMF notification response message to the UDM.

In step 7B12, the SMFn performs the subsequent P-CSCF failure recovery process, as shown in the above process in FIG. 10.

In step 7B13, the UE initiates an IMS registration process through a reselected P-CSCF.

In step 7B14, after the IMS registration process succeeds, the S-CSCF re-forwards the SIP message received in the foregoing step to the new P-CSCF, and the P-CSCF forwards the SIP message to the UE. After receiving the SIP message, the UE continues the subsequent processing.

Embodiment 4

An embodiment of the present disclosure further provides a storage medium. In this embodiment, the storage medium may be configured to store program codes for executing the steps described below.

In step S1, a SMF registration request is sent to UDM, where the SMF registration request carries Internet protocol multimedia core network subsystem (IMS) attribute information.

In step S2, after the SMF successfully registers on the UDM, a P-CSCF failure recovery indication sent by the UDM is received.

In step S3, a P-CSCF failure recovery process is initiated according to the P-CSCF failure recovery indication.

In one embodiment, the storage medium is further configured to store program codes for executing the steps described below.

In step S4, at least one SMF registration request is received from the SMF serving IMS, where one of the SMF registration requests carries IMS attribute information.

In step S5, a specified SMF is selected according to the IMS attribute information in the SMF registration request.

In step S6, a P-CSCF failure recovery indication is sent to the specified SMF, to enable the SMF to initiate a P-CSCF failure recovery process according to the P-CSCF failure recovery indication.

In this embodiment, the storage medium may include, but is not limited to, a universal serial bus flash disk, a read-only memory (ROM), a random access memory (RAM), a mobile hard disk, a magnetic disk, an optical disk or another medium capable of storing program codes.

In this embodiment, a processor executes the step of sending the SMF registration request to the UDM according to the program codes stored in the storage medium, and the SMF registration request carries IMS attribute information.

In this embodiment, a processor executes the step of receiving the P-CSCF failure recovery indication sent by the UDM according to the program codes stored in the storage medium.

In this embodiment, a processor executes the step of initiating the P-CSCF failure recovery process according to the P-CSCF failure recovery indication according to the program codes stored in the storage medium.

For specific examples in the embodiment, reference may be made to the examples described in the above embodiments and optional implementation modes, and the specific examples will not be repeated in this embodiment.

In one embodiment, the present disclosure further provides a processor. The processor is configured to execute a program which, when executed, executes the steps described below.

In step S1, a SMF registration request is sent to UDM, where the SMF registration request carries Internet protocol multimedia core network subsystem (IMS) attribute information;

In step S2, after the SMF successfully registers on the UDM, a P-CSCF failure recovery indication sent by the UDM is received.

In step S3, a P-CSCF failure recovery process is initiated according to the P-CSCF failure recovery indication.

In one embodiment, the program which, when executed, further executes the steps described below.

In step S4, at least one SMF registration request is sent from the SMF serving IMS, where one of the SMF registration requests carries IMS attribute information.

In step S5, a specified SMF is selected according to the IMS attribute information in the SMF registration request.

In step S6, a P-CSCF failure recovery indication is sent to the specified SMF, to enable the SMF to initiate a P-CSCF failure recovery process according to the P-CSCF failure recovery indication.

Apparently, it is to be understood by those skilled in the art that each of the above-mentioned modules or steps of the present disclosure may be implemented by a general-purpose computing apparatus, the modules or steps may be concentrated on a single computing apparatus or distributed on a network composed of multiple computing apparatuses, the modules or steps may be implemented by program codes executable by the computing apparatuses, so that the modules or steps may be stored in a storage apparatus and executed by the computing apparatuses. In some circumstances, the illustrated or described steps may be executed in sequences different from those described herein, or the modules or steps may be made into various integrated circuit modules separately, or multiple modules or steps therein may be made into a single integrated circuit module for implementation. In this way, the present disclosure is not limited to any specific combination of hardware and software.

What is claimed is:

1. A failure recovery method, comprising:
    sending, by a session management function (SMF), at least one SMF registration request to unified data management (UDM), wherein one of SMF registration requests carries Internet protocol multimedia core network subsystem (IMS) attribute information;
    receiving, by the SMF, a proxy call session control function (P-CSCF) failure recovery indication; and
    initiating, by the SMF after receiving the P-CSCF failure recovery indication, a P-CSCF failure recovery process, wherein the initiating the P-CSCF failure recovery process comprises sending, by the SMF, a packet data unit (PDU) connection change request, wherein the PDU connection change request carries an updated P-CSCF address list.

2. The method of claim 1, wherein the IMS attribute information comprises at least one of:
a data network name (DNN) indicating an IMS or an IMS failure recovery support indication.

3. The method of claim 1, wherein the PDU connection change request comprises a PDU connection updating request.

4. The method of claim 1, wherein the P-CSCF failure recovery process comprises the SMF triggering a process of reselecting a P-CSCF.

5. A non-transitory computer-readable storage medium for storing program codes which, when executed by a processor, implement a failure recovery method, comprising:
sending, by a session management function (SMF), at least one SMF registration request to unified data management (UDM), wherein one of SMF registration requests carries Internet protocol multimedia core network subsystem (IMS) attribute information;
receiving, by the SMF, a proxy call session control function (P-CSCF) failure recovery indication; and
initiating, by the SMF after receiving the P-CSCF failure recovery indication, a P-CSCF failure recovery process, wherein the initiating the P-CSCF failure recovery process comprises sending, by the SMF, a packet data unit (PDU) connection change request, wherein the PDU connection change request carries an updated P-CSCF address list.

6. The non-transitory computer-readable storage medium of claim 5, wherein the IMS attribute information comprises at least one of:
a data network name (DNN) indicating an IMS or an IMS failure recovery support indication.

7. The non-transitory computer-readable storage medium of claim 5, wherein the PDU connection change request comprises a PDU connection updating request.

8. The non-transitory computer-readable storage medium of claim 5, wherein the P-CSCF failure recovery process comprises the SMF triggering a process of reselecting a P-CSCF.

9. A communication device, comprising:
a processor configured to execute a program, which when executed, configures the processor to:
send, by a session management function (SMF), at least one SMF registration request to unified data management (UDM), wherein one of SMF registration requests carries Internet protocol multimedia core network subsystem (IMS) attribute information;
receive, by the SMF, a proxy call session control function (P-CSCF) failure recovery indication; and
initiate, by the SMF after the P-CSCF failure recovery indication is received, a P-CSCF failure recovery process, wherein the processor is configured to initiate the P-CSCF failure recovery process by being configured to send, by the SMF, a packet data unit (PDU) connection change request, wherein the PDU connection change request carries an updated P-CSCF address list.

10. The communication device of claim 9, wherein the IMS attribute information comprises at least one of:
a data network name (DNN) indicating an IMS or an IMS failure recovery support indication.

11. The communication device of claim 9, wherein the PDU connection change request comprises a PDU connection updating request.

12. The communication device of claim 9, wherein the P-CSCF failure recovery process comprises the processor of the SMF being configured to trigger a process of reselecting a P-CSCF.

* * * * *

UNITED STATES PATENT AND TRADEMARK OFFICE
CERTIFICATE OF CORRECTION

PATENT NO. : 11,178,714 B2
APPLICATION NO. : 16/780824
DATED : November 16, 2021
INVENTOR(S) : Li et al.

It is certified that error appears in the above-identified patent and that said Letters Patent is hereby corrected as shown below:

On the Title Page

On Page 2, in Item (56), under "OTHER PUBLICATIONS", in Column 2, Line 4, delete "v1.0.0." and insert -- v1.0.0, --, therefor.

In the Drawings

In Fig. 3, Sheet 2 of 8, for Step "3A05.", in Line 2, delete "(APM=IMS)" and insert -- (APN=IMS) --, therefor.

In Fig. 11, Sheet 7 of 8, delete "608n." and insert -- 608b. --, therefor.

In the Specification

In Column 1, Line 37, delete "accesses to the" and insert -- accesses the --, therefor.

In Column 1, Line 45, delete "sufficient optimized." and insert -- sufficiently optimized. --, therefor.

In Column 2, Line 60, delete "professor," and insert -- processor, --, therefor.

In Column 4, Line 24, delete "new generation core (NGC)" and insert -- next generation core (NGC) --, therefor.

In Column 5, Line 18, delete "registration," and insert -- registration. --, therefor.

In Column 6, Line 1, delete "sendssends" and insert -- sends --, therefor.

In Column 6, Line 15, delete "of a" and insert -- of an --, therefor.

In Column 9, Line 67, delete "information;" and insert -- information. --, therefor.

Signed and Sealed this
Ninth Day of August, 2022

Katherine Kelly Vidal
*Director of the United States Patent and Trademark Office*

In Column 10, Line 25, delete "information;" and insert -- information. --, therefor.

In Column 18, Lines 19-20, delete "information;" and insert -- information. --, therefor.